US005492747A

United States Patent [19]
Kemp et al.

[11] Patent Number: 5,492,747
[45] Date of Patent: Feb. 20, 1996

[54] CARGO VESSEL SIDEWALL HAVING A SEAMLESS INTERIOR LINER AND METHOD FOR MAKING THE SAME

[76] Inventors: David A. Kemp, 5012 Cross Ridge Ct., Woodstock, Ga. 30188; Albert H. Berry, III, 4012 Johnson Ferry Dr., Marietta, Ga. 30062

[21] Appl. No.: 231,372

[22] Filed: Apr. 21, 1994

[51] Int. Cl.⁶ ................................................ B32B 7/00
[52] U.S. Cl. .................. 428/98; 52/222; 52/273; 52/582.1; 52/584.1; 52/586.2; 220/445; 220/469; 220/470; 220/553; 296/39.2; 296/181; 296/183; 428/99; 428/251; 428/268; 428/350; 428/480
[58] Field of Search ................ 428/98, 99, 480, 428/350, 251, 268; 296/39.2, 181, 183; 220/553, 1.5, 470, 445, 469; 52/584, 582, 586, 222, 273

[56] References Cited

U.S. PATENT DOCUMENTS

| | | | |
|---|---|---|---|
| 2,389,769 | 11/1945 | Folsom | 428/98 |
| 3,460,299 | 8/1969 | Wilson | 52/222 |
| 3,557,992 | 1/1971 | Reeves | 220/9 |
| 3,614,154 | 10/1971 | Evans | 296/137 |
| 3,711,148 | 1/1973 | Hindin | 296/28 M |
| 3,817,569 | 6/1974 | Ehrlich | 296/28 M |
| 3,917,354 | 11/1975 | Adams, Jr. | 302/52 |
| 3,951,284 | 4/1976 | Fell et al. | 214/152 |
| 3,980,196 | 9/1976 | Paulyson et al. | 220/1.5 |
| 4,021,074 | 5/1977 | Heiser | 298/22 R |
| 4,054,226 | 10/1977 | Bjelland et al. | 220/63 R |
| 4,082,882 | 4/1978 | Weinstein et al. | 428/246 |
| 4,089,555 | 5/1978 | Allen | 296/28 M |
| 4,089,558 | 5/1978 | Banerjea et al. | 296/137 R |
| 4,124,136 | 11/1978 | Bjelland et al. | 220/68 |
| 4,155,469 | 5/1979 | Cole | 414/524 |
| 4,185,024 | 1/1980 | Handrick et al. | 260/369 |
| 4,226,189 | 10/1980 | Bertolini | 105/423 |
| 4,309,054 | 1/1982 | Allen | 296/36 |
| 4,372,568 | 2/1983 | Campbell | 280/63 |
| 4,516,906 | 5/1985 | Krein | 414/786 |
| 4,592,583 | 6/1986 | Dresen et al. | 296/39 R |
| 4,627,629 | 12/1986 | O'Neill | 280/5 D |
| 4,642,314 | 2/1987 | Kidd | 206/600 |
| 4,729,505 | 3/1988 | Remaks et al. | 229/23 R |
| 4,744,137 | 5/1988 | Palazzo | 220/445 |
| 4,863,339 | 9/1989 | Krein | 414/786 |
| 4,884,496 | 12/1989 | Donavich | 98/6 |
| 4,940,279 | 7/1990 | Abott et al. | 296/181 |
| 4,942,978 | 7/1990 | Bessette | 220/470 |
| 4,958,472 | 9/1990 | Ehrlich | 52/584 |
| 5,009,564 | 4/1991 | Lutz et al. | 414/510 |
| 5,022,809 | 6/1991 | Hinson | 414/494 |
| 5,026,112 | 6/1991 | Rice | 296/181 |
| 5,038,960 | 8/1991 | Seery | 220/403 |
| 5,137,170 | 8/1992 | Matias | 220/470 |
| 5,222,621 | 6/1993 | Matias | 220/470 |
| 5,225,812 | 7/1993 | Faghri | 340/605 |
| 5,240,301 | 8/1993 | Arnold | 296/39.2 |

*Primary Examiner*—Nasser Ahmad
*Attorney, Agent, or Firm*—Hopkins & Thomas

[57] ABSTRACT

The invention is a sidewall for a cargo vessel having a seamless, snag-free interior liner. The wall includes an exterior skin that is rivetted to a first side of a supporting sidepost, and a seamless, snag-free interior liner that is mounted to the second side of the sidepost. The method for making the sidewall includes rivetting the exterior skin to the first side of the supports, and then gluing the seamless interior liner material to the second side of the supports with or without tension, and so that the interior liner is not at all pierced by fasteners, or only pierced in areas that are not likely to contact cargo. In a preferred embodiment, the interior liner is mounted to the second side of the supports under tension to maximize the interior liners' ability to absorb and deflect cargo impact and remain snag-free, sag-free and puncture resistant.

16 Claims, 3 Drawing Sheets

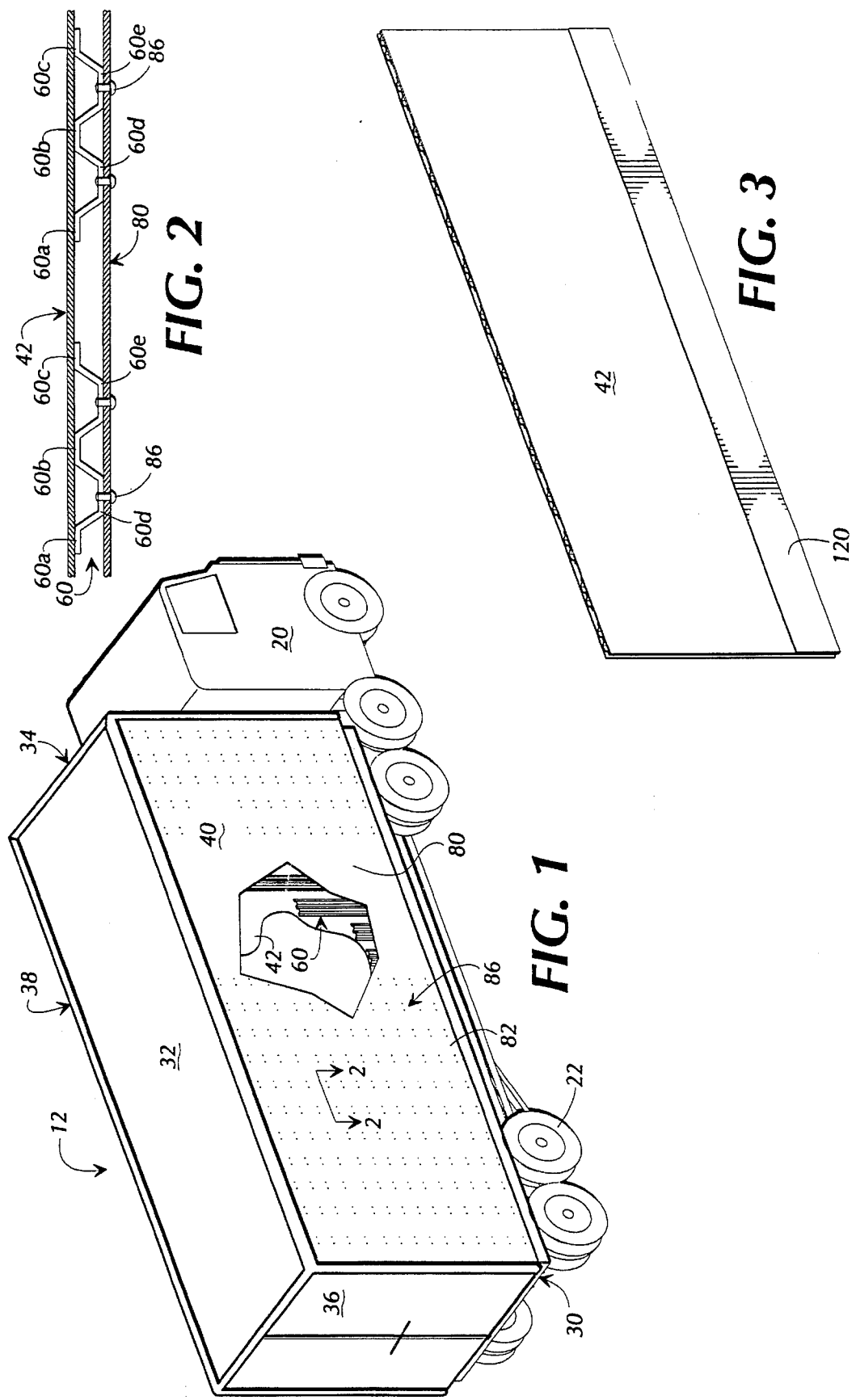

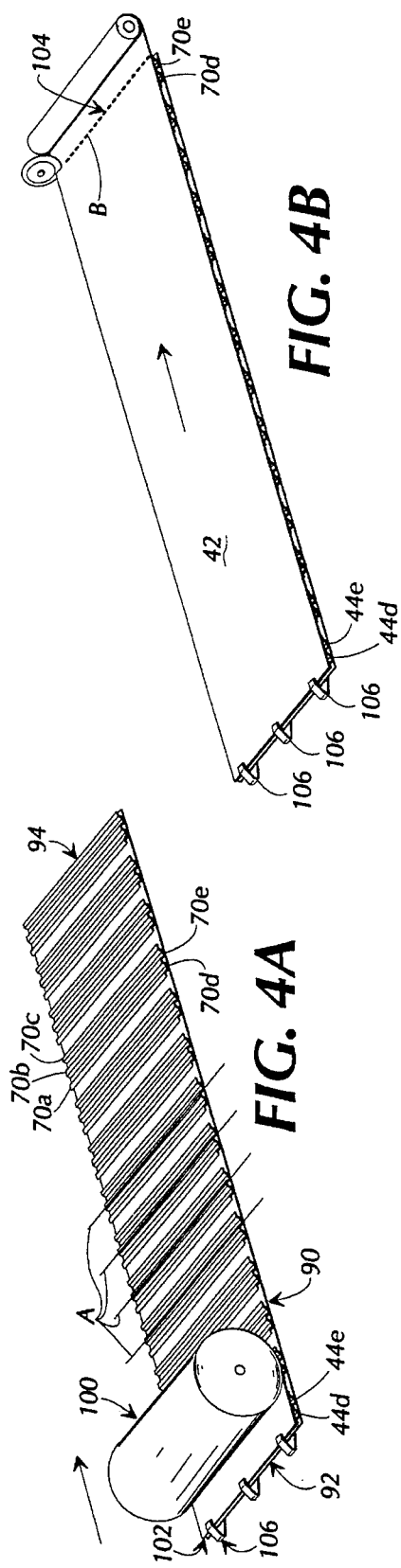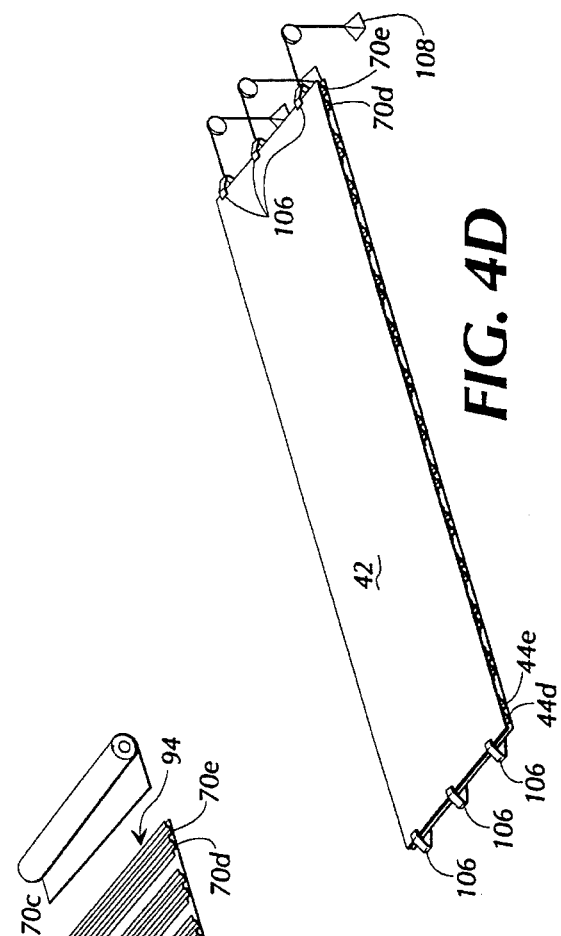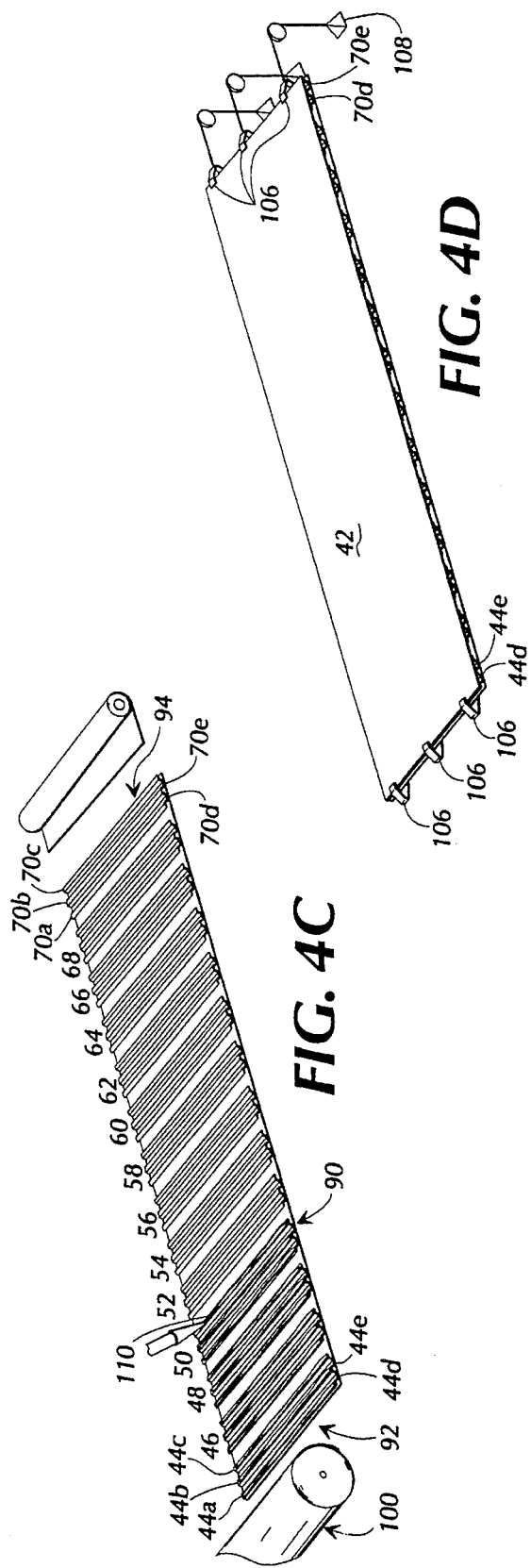

CARGO VESSEL SIDEWALL HAVING A SEAMLESS INTERIOR LINER AND METHOD FOR MAKING THE SAME

FIELD OF THE INVENTION

Briefly stated, the invention is drawn to a cargo vessel having an improved sidewall. More specifically, the invention is drawn to an improved snag-free seamless interior liner for a cargo vessel that is sturdy, puncture resistant, lightweight, relatively thin and light reflective.

BACKGROUND OF THE INVENTION

The transportation of goods and commodities in cargo vessels such as trailer trucks and intermodal containers is well known. Cargo vessels are used to ship such diverse and wide ranging types of goods including packaged goods, unpackaged goods, bulk products, food products, carpeting, grain, fiber, shrink wrapped cargo, and palletized cargo. In order to accommodate such a wide range of goods and their various packagings, efforts have been made to design cargo vessels that have sidewalls that are strong, inexpensive, thin and light enough to keep the overall weight of the vehicle and the resulting shipping costs to a minimum. As is well known, cargo vessels typically comprise a front end wall, a back end wall having a door, a top, a bottom and two sidewalls. The sidewalls of such cargo vessels typically comprise an exterior skin that is connected to an interior liner via a support. For example, the sidewalls of standard well known dry freight cargo vessels have been made by riveting an exterior aluminum outer skin to a hat-shaped support such that the rivet heads protrude beyond the exterior aluminum surface. One or more pieces of plywood are then typically screwed or riveted to the other side of the hat-shaped supports to form an interior liner such that the screw or rivet heads pierce the interior plywood liner and such that the screw or rivet heads are visible on the interior plywood liner. Although such a standard dry freight interior liner is useful, it has several shortcomings. The screw heads protruding beyond both the interior surface of the liner and the joints where the plywood panels meet frequently snag cargo as cargo is loaded into and taken out of the cargo vessel. In addition, the rivet holes in the plywood liner weaken the strength of the liner and thus the liner is susceptible to cracking and splintering. These types of dry freight vessels are also undesirable because they are not multifunctional and often are unsanitary because the interior plywood liners have seams and cracks therein in which debris collects that is difficult to remove. Moreover, the interior plywood liner itself is not resistant to chipping and splintering such that the interior liner deteriorates and is more likely to catch and snag products inserted into and removed from the cargo vessel.

In addition to the above-described well known dry freight vessels, refrigerated-type vessels are also well known in the art. Typically refrigerated vessels are made by riveting an outer aluminum skin to one side of a U-shaped, hat-shaped, Z-shaped, J-shaped or T-shaped support member to form a subassembly. Styrofoam block furrings are then taped to an opposing side of the support bracket and the subassembly is stood-up and positioned on the bottom of the cargo vessel. Thereafter, a planar, rigid fiberglass-type liner material is riveted to the styrofoam furrings to hold the inner fiberglass liner in place. The rivets pierce the fiberglass liner and the rivet heads typically protrude beyond the surface of the fiberglass liner. After the exterior skin and interior liner are attached, an air space is formed therebetween in which foam is injected to provide insulation. The injected foam not only provides insulation, but it also provides support for the interior fiberglass liner and helps keep the fiberglass liner frown sagging between the U-shaped, hat-shaped, Z-shaped, J-shaped or T-shaped support members. Although this type of refrigerated cargo vessel has also been useful, it too has several shortcomings. For example, the rivets which attach and hold the interior fiberglass liner to the styrofoam furrings frequently snag cargo as cargo is loaded into and removed from the cargo vessel. Moreover, assembly of these types of refrigerated fiberglass liners typically require the temporary installation and subsequent removal of shoring in between the exterior and interior sidewalls of the cargo vessel which increases the time and cost of production. Shoring is necessary to prevent excessive bulging of the thin fiberglass liners during the foaming operation due to the pressure created by the expanding foam. As an alterative to shoring, a large and expensive press assembly is sometimes used.

Since cargo vessels having interior fiberglass liners can be used for hauling meat and other foodstuffs, torn or damaged liners quickly render the trailers unsuited for service because of the potential contamination of food with the fiberglass fibers of the lining and also because food and debris is trapped in the broken areas of the lining. Consequently, the thin fiberglass liners, typical in refrigerated cargo vessels, need prompt repair if they become damaged.

In addition to constructing a sidewall having liners that are light weight and snag resistant, it is also desirable to construct relatively thin sidewalls so that the total inside dimensions of the trailer body can be maximized in order to carry the optimum amount of cargo. However, in order to have a thin sidewall the individual components of the sidewall, i.e. the exterior skin, the supports and the interior liner have to be made of strong materials that are assembled in such a way to be snag-resistant and thin.

A need therefore exists for a new and improved sidewall for a cargo vessel having a seamless, snag-free, low friction interior liner that is made from one unitary piece of interior liner material and which is mounted to unique flying-W supports by a mounting means that does not at all pierce the interior liner, or only pierces the interior liner in areas that are not likely to come into contact with cargo. Likewise, a need also exists for a method of making such a sidewall.

A need further exists for a seamless, low friction interior liner that is mounted under tension to a plurality of supports such that the interior liner is able to be relatively snag resistant and which, in addition, is able to absorb and deflect punishment without being scratched, punctured or otherwise defaced.

An additional need exists for a thin, light weight and inexpensive cargo vessel sidewall having a seamless interior liner that maximizes the amount of cargo that can be loaded into the cargo vessel.

A need also exists for a seamless, low friction interior liner that is light reflective and sanitary such that it can be used to haul diverse cargo like packaged and unpackaged foods, grains, carpeting, shrink-wrapped cargo, palletized cargo and bulk products.

SUMMARY OF THE INVENTION

Briefly described, the invention is drawn to a new sidewall for a cargo vessel. In addition, the present invention is also drawn to a new method for making a sidewall for a cargo vessel. The new sidewall of the present invention can be used for any type of cargo vessel including but not limited to track trailers, intermodal containers, train rail cars, vans, pick-up tracks, sea vessels, and airplanes.

The sidewall of the present invention generally comprises an exterior skin, a plurality of supports and a seamless, low friction interior liner. The seamless interior liner of the present invention is particularly novel and useful because it can be mounted such that it does not have any rivet heads, or seams on its interior surface. Hence, the sidewall of the present invention is sturdy, puncture resistant, and does not snag or catch cargo as cargo is loaded into and taken out of the cargo vessel. A cargo vessel having the sidewall of the present invention can therefore be used to haul such diverse cargo as cellophane-wrapped cargo, bulk products, carpeting, fruits, vegetables, meats, grains, fiber products, palletized cargo, and shrink-wrapped cargo.

The exterior skin component of the present invention is well known in the art. The exterior skin, which should be from 0.032–0.150 inches thick, is preferably made from aluminum, but it can also be made from steel, teflon, wood, plastic, fiberglass, fabrics/textiles or ceramics.

The exterior skin is riveted to supports or sideposts. The sideposts, of the present invention are termed flying-W supports or sideposts because of their appearance. The flying-W supports, similar to the letter "W" have one side with two faces and a second side with three faces. The two face side of a support is connected to the three face side of a support by one or more legs. Similar to the letter "W? " each support has four legs comprising two pairs of legs that are parallel to one another. In use, the two-faced sides of the flying-W supports are connected to the exterior skin and the three-faced sides are connected to the seamless interior liner. Although the supports of the present invention can be of different shapes, the flying-W supports are preferable because of the wide span of support that the three faced sides provide to the seamless interior liner. This wide span of support helps to minimize the sagging of the liner between the supports. However, L-shaped, M-shaped, I-shaped, U-shaped, H-shaped, and T-shaped supports, among others, can be used.

The flying-W supports are also particularly advantageous because of the unique combination of the wide span of support provided by the three-faced sides while at the same time the thickness of the support, i.e. the distance from the two-faced side to the three-faced side is thin, typically ¾ of an inch, such that the packing width available to load cargo within the cargo vessel is maximized.

The supports of the present invention can be constructed of aluminum, steel, graphite, plastic, teflon, ceramic, various other metal based materials, and composites thereof. Ideally, however, the support material should be selected by determining which material is strongest, thinnest, lightest in weight and least expensive. The preferred support of the present invention is an aluminum flying-W support.

The interior seamless liner of the present invention is mounted onto the three-faced sides of the plurality of supports. The interior seamless liner can be mounted by any means, however, the means for mounting the seamless liner to the supports preferably does not pierce the interior seamless liner, or only pierces the interior liner in areas that are not likely to come into contact with the cargo. Therefore, the preferred mounting means is an adhesive which can be applied and adhered to the three-faced sides of the supports and which will adhere to the seamless interior liner. Such adhesives include water soluble adhesives and polyurethane among others. A preferred characteristic of the adhesive is that it will not cure or set until approximately fifteen to thirty minutes after the interior seamless liner has been applied thereto. This time period allows the interior liner to be smoothed, flattened and positioned as is necessary before the adhesive cures and permanently fixes the interior liner in place. The interior liner can be smoothed and flattened by any type of roller, such as a lawn roller.

The seamless interior liner material can be made of glass, polyester, glass reinforced polyester and composites thereof. The preferred material for the interior liner is Kemlite, which is a glass reinforced polyester that can be purchased from the Kemlite Company in Joliet, Ill. The material for the interior liner is preferably fixed to the adhesive coated flying-W supports while the interior liner material is held under tension. In addition, the interior liner material is also preferably thin (50 mil.–150 mil.) to maximize the cargo area, while at the same time maintaining the interior liners' snag resistance, deflection and pliability.

Because the interior liner material is adhesively mounted to the supports in one piece, the interior liner is seamless, which means that there are no cracks, crevices, or seams in which food and other debris can collect. In addition, as the liner material is made of glass and/or polyester, the material has a low coefficient of friction which results in a low friction interior liner that can facilitate the loading and unloading of cargo within the cargo vessel. Moreover, as the interior liner absorbs and deflects punishment, is puncture resistant, seamless and is not pierced by rivets or screws, the interior seamless liner is snag-free, splinter free and will not inhibit the loading or unloading of cargo within the cargo vessel.

After the seamless interior liner has been affixed to the flying-W sideposts, an air space is created in between the exterior skin and the interior liner. In the past, if a cargo vessel is to be used to haul refrigerated cargo the corresponding air space would necessarily be filled with foam because foam adds both insulation and support to the sidewall. However, the sidewall of the present invention, due to its construction, has ample support, strength and rigidity without employing any foam.

In an alternative embodiment, a scuff-band is mounted lengthwise to the lower portion of the interior liner. Preferably, the scuff-band is in effect an additional layer of Kemlite or aluminum that is included to provide added strength and scratch resistance in the area of the interior liner prone to the most abuse from fork-lifts and similar equipment. The scuff-band is either integrally made into the one piece seamless interior liner, or it can be mounted to the interior sidewall by countersunk fasteners.

The wall of the present invention can generally be made by attaching the exterior skin to one side of the sideposts and thereafter mounting the seamless interior liner to the second side of the sideposts. The seamless interior liner can be mounted to the supports with and without tension, and/or the seamless interior liner can be mounted to the supports so that the mounting means does not pierce the interior liner in an area likely to come into contact with the cargo, i.e. usually the top and corner edges of the interior liner. In addition, after the seamless interior liner has been located by the supports, tension can be supplied by a tensioning apparatus.

More specifically, the sidewall of the present invention is made by first aligning the flying-W supports parallel to one another. Preferably, the vertical centerlines of each support are spaced apart from one another twelve inches (12") and the distance in between adjacent supports does not exceed three inches. Alternatively, the vertical centerlines of adjacent supports may be located sixteen inches (16") or less apart. After the supports have been properly aligned, the exterior skin is riveted to the two-faced sides of the flying-W supports to form a subassembly. The subassembly is then inverted so that the three-faced sides of the flying-W supports are exposed. A first end of the interior liner material is then clamped to a first end of the subassembly. The interior liner material is then temporarily positioned over the subassembly and cut so that a second end of the interior liner material corresponds to a second end of the subassembly.

The interior liner material is then rolled back temporarily to expose the three-faced side of the flying-W supports. After an adhesive has been applied along the faces of the three-faced sides of the supports, the interior liner material is repositioned over the subassembly and tensioned. The interior liner material is then rolled with a roller to smooth and flatten the surface of the interior liner material before the adhesive cures. After the adhesive cures, a scuff-band can be mounted lengthwise along the lower portion of the interior liner by countersunk fasteners, or in an alternative embodiment, the scuff-band can be integrally made into the seamless interior liner. Thereafter, the sidewall is connected to the bottom of the cargo vessel as is well known in the art.

Preferably, when the interior liner material is Kemlite, which usually comes in rolled form, the Kemlite is unrolled over the flying-W supports of the subassembly. A cut line is marked on the interior liner material that roughly corresponds to the second end of the subassembly and the material is cut along the cut line to form the second end of the interior liner material. The cut to length interior liner material is then rerolled, i.e. it is rolled back up toward its first end so that the three faces of each flying-W support are exposed. The adhesive is then applied along each face of the three-faced sides of the flying-W supports. Then, the cut interior liner material is stretched over the subassembly, so that, the liner material contacts the adhesive, and is tensioned. Tension is provided by a come-along, a chain block, a drive screw or a similar mechanical apparatus. While maintaining tension in the interior liner material, the second end of the liner material is clamped to the second end of the subassembly. Before the adhesive cures, the interior liner material is rolled with a roller to smooth and flatten the interior liner. Either the tensioning apparatus or the clamps can then be removed while the adhesive dries. After the adhesive is dry, the remaining tensioning apparatus and/or the clamps are removed. Finally, the sidewall is connected to the bottom of the cargo vessel as is well known in the art. However, it should be appreciated that the sidewall is free standing in between the sideposts.

It is therefore an object of the present invention to provide a sidewall with a seamless interior liner for a cargo vessel that is relatively light weight, as compared to heavy metal and rigid fiberglass sidewall structures, and inexpensive to manufacture.

It is also an object of the present invention to provide an improved method for construction of a sidewall that enables the easy replacement of the lower area of the seamless liner, which is subject to the most abuse.

Another object of the present invention is to provide a novel method of making a sidewall with a seamless interior liner by applying to a subassembly an interior liner material under tension that is impact resistant, weather resistant, and light reflective.

A further object of the present invention is to provide a sidewall with a seamless liner that virtually eliminates nicks, scratches, tears and other imperfections thus providing a smooth, low friction, snag-free, sag-free interior that does not inhibit the loading and unloading of cargo within the cargo vessel.

It is another object of the present invention to provide a sidewall for a cargo vessel having an interior liner that is glued to supports, rather than riveted or screwed, such that the interior liner is not punctured by such rivets or screws and also such that the rivet heads or screw heads do not snag cargo as cargo is loaded into and removed from the cargo vessel.

It is another object of the present invention to provide a sidewall liner that derives its strength and sag-resistance from being mounted on flying-W supports and also by mounting the interior liner under tension.

It is yet another object of the present invention to provide an interior seamless liner that is not supported by a foam backing and which is free standing in between sideposts.

Another object of the present invention is to provide an interior seamless liner that appears brighter as it is light reflective, which results in greater visibility.

It is another object of the present invention to provide an interior seamless liner that is more hygienic and thus can be used to transport diverse cargo because the seamless interior liner will not collect and trap debris and is easy to clean.

Other objects, features and advantages of the present invention will become apparent from the following specification, when read in conjunction with the accompanying claims.

BRIEF DESCRIPTION OF THE DRAWINGS

FIG. 1 is a perspective view of a cargo vessel having the sidewall of the present invention, with portions broken away to reveal the intermediate vertical supports.

FIG. 2 is a top cross-sectional and interior wall panel view of the sidewall of the present invention, taken along lines 2—2 of FIG. 1.

FIG. 3 is a perspective view of a portion of the sidewall of the present invention.

FIGS. 4A–D are perspective views of a progressive method for making the sidewall of the present invention.

DETAILED DESCRIPTION

Figure 1A:
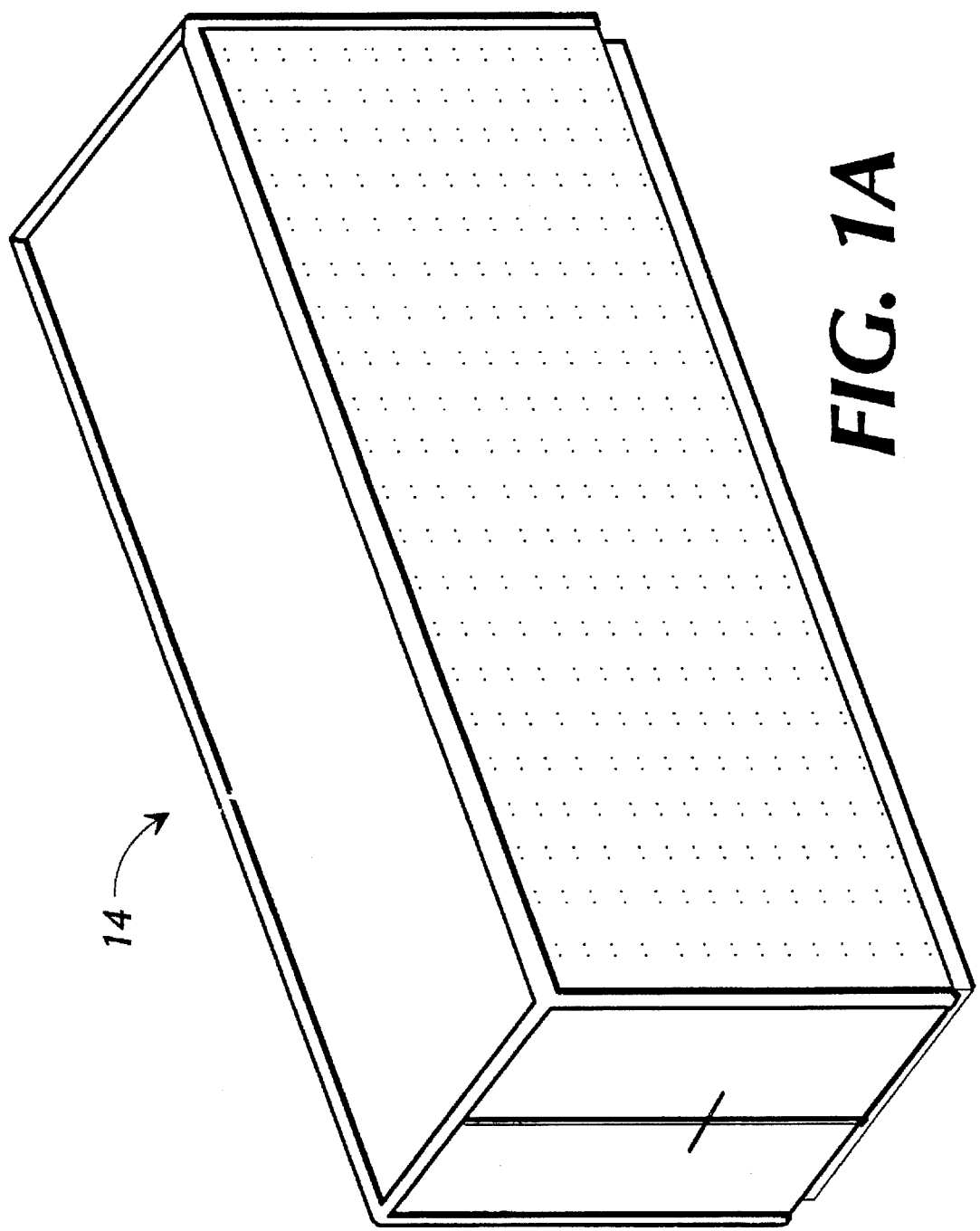
FIG. 1A is a perspective view of an alternative cargo vessel.

Referring now in more detail to the drawings, in which like numerals represent like parts throughout the several views, FIGS. 1 and 1A illustrate two cargo vessels, truck trailer 12 and intermodal container 14. As the herein described seamless interior sidewall can be used in any type of cargo vessel, the sidewall of the present invention is disclosed herein as it exists in truck trailer 12. Regardless of the particular type of cargo vessel in which the herein described sidewall having a seamless liner is found, the sidewall and the method for making and installing the sidewall are substantially the same. Truck trailer 12, which is generally well known in the art, is connected to tractor 20 and is mounted to and supported by conventional wheel assemblies 22. Truck trailer 12 itself is defined by floor 30; roof 32, sealed end wall 34, openable end 36, and vertical sidewalls 38 and 40. As for all intents and purposes the interior construction of end wall 34 and sidewalls 38 and 40 is substantially identical, only sidewall 40 will be discussed in detail hereinafter.

As illustrated in FIG. 2 and FIG. 4, sidewall 40 generally comprises exterior skin 80, upright flying-W supports 44, 46, 48, 50, 52, 54, 56, 58, 60, 62, 64, 66, 68, and 70 and interior liner 42. The upright flying-W supports are elongated rectilinear beams which are shaped in transverse cross-section in the form of a flattened or "flying" W, with the legs that form the W shape flattened at both ends to form support segments a, b, c, d, and e between adjacent legs and at the end of the legs. Exterior skin 80 is rivetted to the two-faced sides (sides (d) and (e)) of flying-W supports 44, 46, 48, 50, 52, 54, 56, 58, 60, 62, 64, 66, 68, and 70 to form subassembly 90 (see FIGS. 4(A)–4(D)). As shown in FIG. 1 and FIG. 2, rivet heads 86 extend beyond outer side 82 of exterior skin 80. On the other hand, interior liner 42 is mounted onto the three-faced sides (sides (a), (b) and (c)) of flying-W supports 44, 46, 48, 50, 52, 54, 56, 58, 60, 62, 64, 66, 68, and 70 by mounting means 110 such that mounting means 110 does not pierce interior liner 42. Rather than rivets, screws or bolts, interior liner 42 is glued or adhesively mounted to the three-faced sides (sides (a), (b) and (c)) of flying-W supports 44, 46, 48, 50, 52, 54, 56, 58, 60, 62, 64, 66, 68, and 70. As such, mounting means 110 fixes interior liner 42 into position, but does not pierce or extend beyond interior liner 42.

Interior liner 42 can be made from glass, polyester, or glass-reinforced polyester, that is pliable, flexible, and tensionable. In a preferred embodiment, seamless interior liner 42 is made of Kemlite, which is a glass-reinforced polyester material that can be purchased from the Kemlite Company in Joliet, Ill. Although the thickness of seamless interior liner 42 can be varied to suit the particular needs of the user, 50–150 mil thick, and preferably 100 mil thick, has been found to be an ideal thickness that provides the desired strength, flexibility, force absorption, puncture resistance, and sag resistance, while at the same time is thin enough to optimize the carrying capacity of truck trailer 12. Moreover, although for particularity, fourteen flying-W supports have been defined (Nos. 44, 46, 48, 50, 52, 54, 56, 58, 60, 62, 64, 66, 68, and 70), it should be appreciated by one of skill in the art that the number of supports will vary with the desired length of wall 40.

Referring now to FIGS. 4(A)–4(D), the sidewall of the present invention is made by first aligning flying-W sideposts 44, 46, 48, 50, 52, 54, 56, 58, 60, 62, 64, 66, 68, and 70 such that the vertical centerlines ("A") of each support are parallel to one another. And, in a preferred embodiment, flying-W sideposts 44, 46, 48, 50, 52, 54, 56, 58, 60, 62, 64, 66, 68, and 70 should be arranged so that their vertical centerlines ("A") are spaced twelve inches (12") apart. Supports 44, 46, 48, 50, 52, 54, 56, 58, 60, 62, 64, 66, 68, and 70 should also preferably be arranged so that no more than a three inch (3") span exists in between adjacent supports, i.e. the span from face (c) of an adjacent support to face (a) of a support should not exceed three inches (3"). Alternatively, spans not exceeding seven inches (7") may be used with corresponding supports spaced sixteen inches (16") or less apart.

After the plurality of sideposts 44, 46, 48, 50, 52, 54, 56, 58, 60, 62, 64, 66, 68, and 70 have been properly aligned and spaced to fit the desired sidewall height and length, exterior skin 80 is rivetted to the two-faced sides (sides (d) and (e)) of supports 44, 46, 48, 50, 52, 54, 56, 58, 60, 62, 64, 66, 68, and 70 to form subassembly 90. Subassembly 90 is then inverted so that the three-faced sides (sides (a), (b) and (c)) of flying-W supports 44, 46, 48, 50.52, 54, 56, 58, 60, 62, 64, 66, 68, and 70 are exposed. Thereafter, first end 102 of a roll of interior liner material 100 is clamped to first end 92 of subassembly 90 by clamps, jigs, or fasteners 106. The roll of interior liner material 100 is then unrolled toward second end 94 of subassembly 90 until interior liner material 100 has been unrolled beyond second end 94 of subassembly 90. While interior liner material 100 is aligned with subassembly 90, cut line ("B") is traced on interior liner material 100. Interior liner material 100 is then cut along cut line ("B") to create second end 104 of interior liner material 100. Next, the cut to length interior liner material 100 is rerolled from second end 104 toward first end 102 so that adhesive 110 can be applied to the three-faced sides (sides (a), (b) and (c)) of flying-W supports 44, 46, 48, 50, 52, 54, 56, 58, 60, 62, 64, 66, 68, and 70.

After the application of adhesive 110, interior liner material 100 is unrolled over adhesive 110 and flying-W supports 44, 46, 48, 50, 52, 54, 56, 58, 60, 62, 64, 66, 68, and 70 until second end 104 of interior liner material 100 covers second end 94 of subassembly 90° Clamps 106 are then used to hold second end 104 of interior liner material 100 and the interior liner material is tensioned with mechanical tensioning apparatus 108. Then, before adhesive 110 cures, which is approximately thirty minutes, interior liner 42 is rolled with a roller to smooth and flatten interior liner material 100. After adhesive 110 has cured, clamps 106 and corresponding tensioning apparatus 108 are removed and wall 40 is connected to bottom 30 of trailer 12 as is well known in the art.

In an alternative embodiment, after adhesive 110 has cured, scuff-band 120 is attached to interior liner sidewall 42 as shown in FIG. 3. Scuff-band 120 is either connected to liner 42 by countersunk fasteners, or scuff-band 120 is integrally made into seamless liner 42 to form one piece.

In another embodiment, after supports 44, 46, 48, 50, 52, 54, 56, 58, 60, 62, 64, 66, 68, and 70 have been attached to exterior skin 80, interior liner material 100 is mounted onto the three-faced sides (sides (a), (b) and (c)) of supports 44, 46, 48, 50, 52, 54, 56, 58, 60, 62, 64, 66, 68, and 70 by a mounting means that does not pass through interior liner 42. However, if necessary, interior liner 42 can be rivetted to supports 44–70 in locations that are not likely to interfere with or inhibit cargo handling as cargo is loaded into and removed frown track 12. Such locations are preferably along the perimeter of interior liner 42.

The features and principles of the present invention have been illustrated in the foregoing description of preferred embodiments thereof. It will be apparent to those skilled in the art that numerous changes or modifications may be made without departure frown the spirit and scope of the invention as claimed hereinafter.

We claim:

1. A cargo vessel having a sidewall, comprising:
   (a) an exterior metallic skin, said exterior skin having an outer side and an inner side;
   (b) at least three intermediary sideposts, each of which having an outer face and an inner face, wherein the outer face of said sideposts are attached to the inner side of said exterior skin; and
   (c) a puncture resistant seamless interior non-metallic liner that provides strength and rigidity to said sidewall mounted to the inner face of said sideposts by an adhesive, wherein said adhesive holds said seamless interior liner under tension such that said liner traverses said sideposts and is substantially unsupported in between said sideposts.

2. The cargo vessel of claim 1, further comprising a scuff-band connected to said seamless interior liner to prevent the lower portion of said seamless interior liner from being damaged.

3. The cargo vessel of claim 1, wherein said seamless interior liner is not supported by backing foam.

4. The cargo vessel of claim 1, further comprising an air cavity that is less than one inch wide in between said exterior skin and said seamless interior liner.

5. The cargo vessel of claim 1, wherein said sideposts are arranged such that a span of seven inches or less exists between each sidepost so that no greater than a seven inch interval of said seamless interior liner is unsupported by said sideposts.

6. The cargo vessel of claim 1, wherein said sideposts are arranged such that the vertical center line of said sideposts are not greater than sixteen inches apart from one another.

7. The cargo vessel of claim 1, wherein said adhesive is selected from the group consisting of water soluble adhesives and polyurethane.

8. The cargo vessel of claim 1, wherein said seamless interior liner is light reflective.

9. The cargo vessel of claim 1, wherein said seamless interior liner is comprised of a material selected from the group consisting of glass, polyester, glass reinforced polyester, and KEMLITE.

10. The cargo vessel of claim 1, wherein said seamless interior liner does not accumulate debris.

11. A sidewall for a cargo vessel, comprising:

(a) at least the intermediary supports each having an outer face and an inner face;

(b) an exterior metallic skin, said exterior skin attached to said outer faces of said plurality of supports; and (c) a puncture-resistant sag-free interior non-metallic liner that traverses said supports and provides strength and rigidity to said sidewall mounted to said inner faces of said supports by a mounting means that does not pierce said interior liner in areas of said liner that are likely to come into contact with cargo such that said liner is unsupported and free standing in between said supports.

12. The sidewall of claim 11, wherein said sag-free liner is comprised of a material selected from the group consisting of glass, polyester, glass reinforced polyester, and KEMLITE.

13. The sidewall of claim 11, wherein said supports are flying-W sideposts each having two outer faces and three inner faces.

14. The sidewall of claim 11, further comprising a scuffband attached to said interior liner.

15. A sidewall for a cargo vessel, comprising:

an exterior metallic skin having an outer side and an inner side;

a plurality of intermediary flying-W sideposts, each of which having a first supporting outer face spaced apart from a second supporting outer face and a first supporting inner face spaced apart from a second supporting inner face and a third supporting inner face spaced apart from the second supporting inner face, wherein the outer faces of said sideposts am attached to the inner side of said exterior skin; and a puncture-resistant seamless interior liner-that is approximately 50–150 mil thick, comprising a polyester, that traverses said plurality of sideposts and that provides strength and rigidity to said sidewall mounted to the three inner faces of said sideposts by a mounting means that does not pierce the interior liner in areas of said liner that are likely to come into contact with cargo such that said liner is unsupported and free standing in between said plurality of sideposts.

16. The sidewall of claim 15, wherein said exterior skin is from 0.032–0.15 inches thick and said flying-W support is approximately 0.75 inches thick.

* * * * *